E. S. BOYER.
BATTERY JAR AND PROCESS OF MAKING SAME.
APPLICATION FILED JULY 14, 1921.

1,425,574.

Patented Aug. 15, 1922.
2 SHEETS—SHEET 1.

E. S. BOYER.
BATTERY JAR AND PROCESS OF MAKING SAME.
APPLICATION FILED JULY 14, 1921.

1,425,574.

Patented Aug. 15, 1922.

Inventor
Edwin S. Boyer
By his Attorney

UNITED STATES PATENT OFFICE.

EDWIN S. BOYER, OF PLAINFIELD, NEW JERSEY, ASSIGNOR TO AMERICAN HARD RUBBER CO., OF NEW YORK, N. Y., A CORPORATION OF NEW YORK.

BATTERY JAR AND PROCESS OF MAKING SAME.

1,425,574. Specification of Letters Patent. Patented Aug. 15, 1922.

Application filed July 14, 1921. Serial No. 484,800.

*To all whom it may concern:*

Be it known that I, EDWIN S. BOYER, residing at Plainfield, county of Union, and State of New Jersey, have invented new and useful Improvements in Battery Jars and Processes of Making Same, of which the following is a full, clear, and exact description such as will enable others skilled in the art to which it appertains to make and use the same.

This invention relates to battery jars made of hard rubber arranged to be held together in series or multiple by a hard rubber container and to the process of making the same, and the objects of the invention are to provide means for making and holding a plurality of individual hard rubber battery cells together as a unit and as if made in one piece.

Referring to the drawings:—

Figure 1:
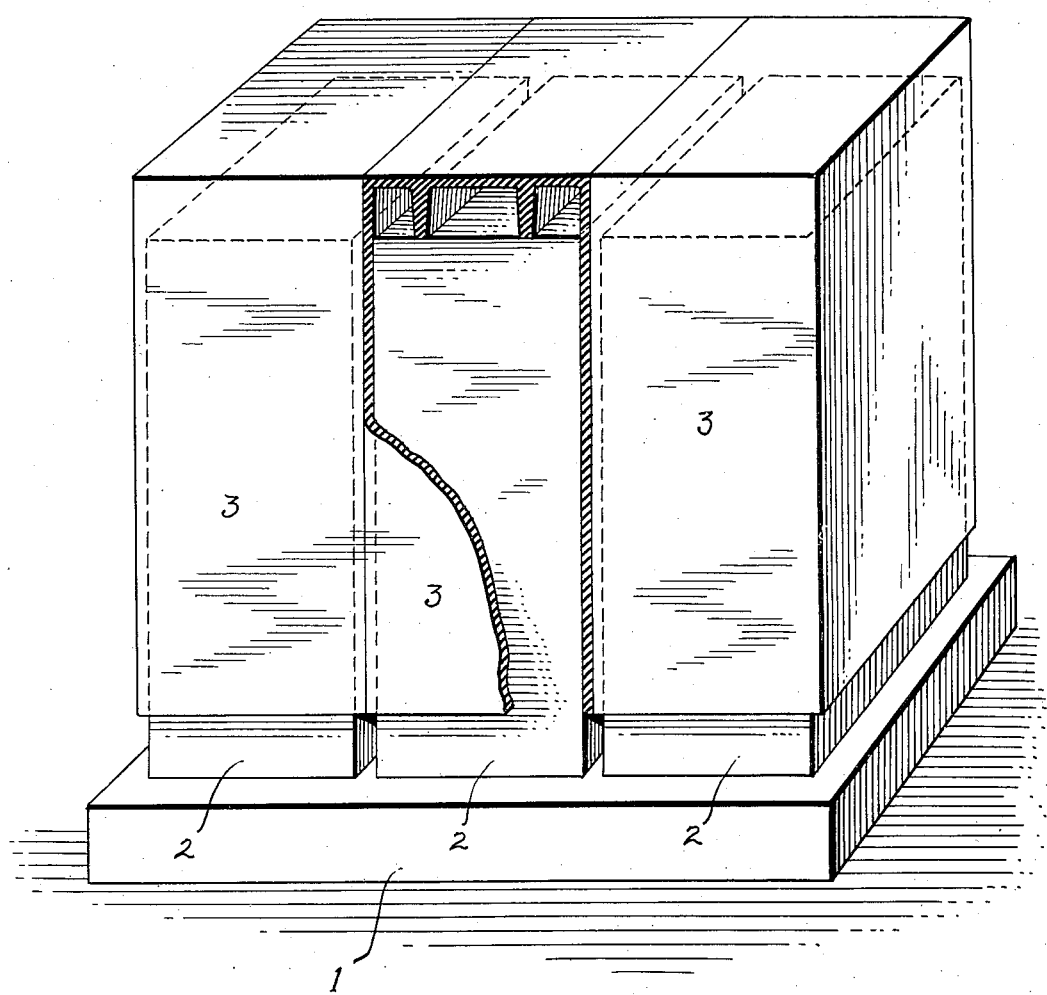
Figure 1 is a perspective view of the individual hard rubber battery jars mounted upon a plurality of battery cores, partly in section.

In the drawings 1 designates, in the present instance, a suitable core base provided with a plurality of battery cores 2, in the present instance, three in number, secured to the core base 1 and suitably spaced apart to engage and suitably hold three completed hard rubber battery jars 3 side by side as shown in Figure 1.

Figure 2:
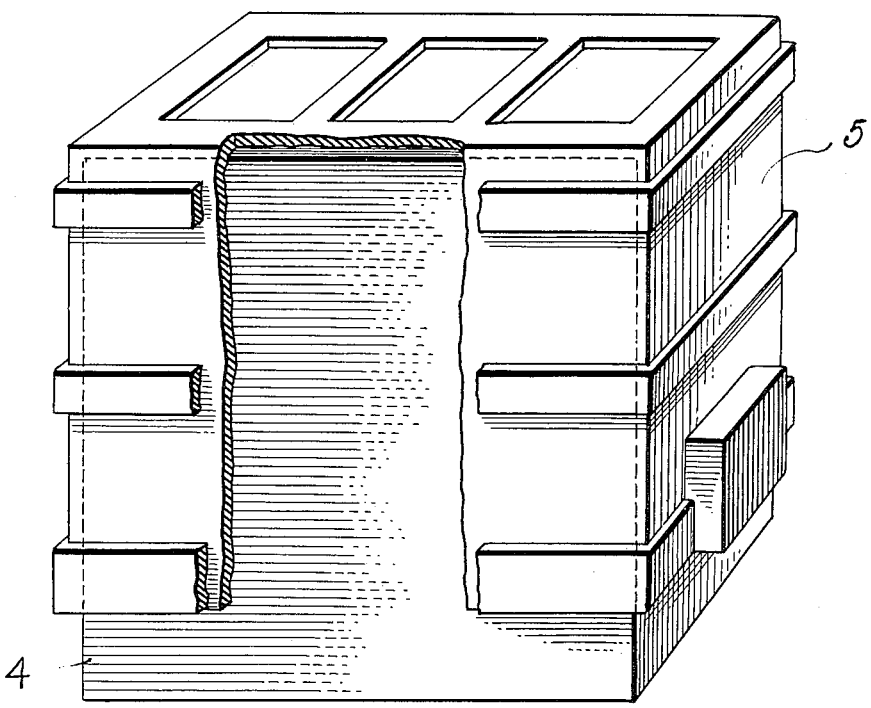
Figure 2 is a perspective view of the hard rubber container mounted upon a container core, partly in section.

A suitable container core 4 of substantially the same outside dimensions as the outside dimensions of the three completed hard rubber battery jars 3 is provided as shown in Figure 2 on which is suitably vulcanized a hard rubber container 5. After the hard rubber container 5 has been suitably vulcanized it is removed from the container core 4 while still hot and before it has an opportunity to cool, and slipped over the three battery jars 3 shown in Figure 1. In cooling the hard rubber container 5 shrinks about the battery jars 3, the cores 2 on the core base 1 acting to prevent the battery jars from collapsing.

It is advisable to place a weight (not shown) on top of the container 5 during the cooling operation to hold the same in place.

Figure 3:
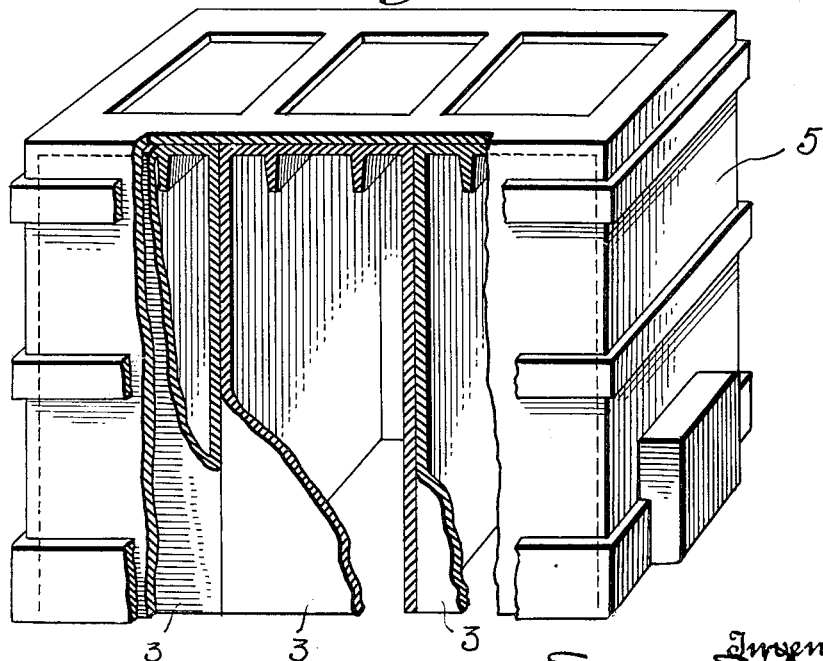
Figure 3 is a perspective view of the individual hard rubber battery jars with the hard rubber container shrunk thereon, partly in section.

After the hard rubber container 5 has cooled and set about the battery jars 3 the cores 2 are removed producing the finished article shown in Figure 3.

If desired the battery jar core base 1 can be provided with two, three or more cores to hold any desired number of individual battery jars, side by side in series, as shown in Figure 1; the outside dimensions of the container core 4 being made, in each instance, to correspond with the outside dimensions of the assembled battery jars, as before described.

It is also to be understood that if desired the battery jar core base 1 can be provided, for example, with four or six cores to hold the individual battery jars side by side and end to end in multiple, the outside dimensions of the container core 4 being made in each instance as before described to correspond with the outside dimensions of the assembled battery jars to permit the container 5 made thereon to slip over the assembled battery jars as before described to hold the same together.

From the above description it will be seen that individual battery jars held together by a container have all the advantages of a plurality of battery jars made in one piece, with the decided advantage that individual battery jars are standard and can be grouped either in series or multiple, as may be desired, necessitating only different size containers, made as above described, to hold the individual battery jars together.

Battery jars held together in this manner also have the advantage of permitting the replacing of one or more of the individual cells should any become broken in use.

While the invention has been described with particular reference to the details of construction and to the process of making same it is not to be considered as limited thereto as many changes can be made and still fall within the scope of the invention set forth in the following claims:—

What I claim is:—

1. The process of holding a plurality of individual hard rubber battery jars together in a hard rubber container which comprises mounting the completed individual battery jars adjacent each other upon a plurality of battery cores one for each battery jar, enclosing the assembled battery jars by a hard rubber container made to slip over the battery jars immediately after the same has been vulcanized while still hot and before it has an opportunity to cool, permitting the container to shrink in cooling to firmly bind the individual battery jars and container together.

2. The process of holding a plurality of individual hard rubber battery jars together in a hard rubber container which comprises mounting a plurality of completed individual battery jars immediately adjacent each other upon a plurality of battery cores, one for each battery jar, enclosing the assembled battery jars by a hard rubber container made to slip over the battery jars immediately after the same has been vulcanized while still hot and before it has an opportunity to cool, exerting pressure on top of said container to hold the same in place, and permitting the container to shrink in cooling to firmly bind the individual battery jars and container together.

3. A plurality of individual hard rubber battery jars held together as a unit by means of a hard rubber outside container made to enclose the assembled battery jars and shrunk thereon.

In testimony whereof I have signed this specification in the presence of two subscribing witnesses.

EDWIN S. BOYER.

Witnesses:
FREDERIC G. ACHELIS,
E. W. BELCHER.